US010033991B2

United States Patent
Shanmugam (10) Patent No.: US 10,033,991 B2
(45) Date of Patent: Jul. 24, 2018

(54) VIDEO DISPLAY FOR VIEWING THROUGH POLARIZED ACTIVE SHUTTER GLASSES

(71) Applicant: ARRIS Enterprises LLC, Suwanee, GA (US)

(72) Inventor: Senthilprabu Vadhugapalayam Shanmugam, Bengaluru (IN)

(73) Assignee: ARRIS Enterprises LLC, Suwanee, GA (US)

(*) Notice: Subject to any disclaimer, the term of this patent is extended or adjusted under 35 U.S.C. 154(b) by 0 days.

(21) Appl. No.: 15/052,185

(22) Filed: Feb. 24, 2016

(65) Prior Publication Data

US 2017/0244958 A1    Aug. 24, 2017

(51) Int. Cl.
*H04N 13/04* (2006.01)
*G02B 27/26* (2006.01)
*G02B 27/28* (2006.01)

(52) U.S. Cl.
CPC ......... *H04N 13/0434* (2013.01); *G02B 27/26* (2013.01); *G02B 27/286* (2013.01); *H04N 13/0445* (2013.01); *H04N 2013/0463* (2013.01)

(58) Field of Classification Search
CPC ........... H04N 13/0434; H04N 13/0445; G02B 27/26; G02B 27/286; G02B 348/59
USPC ................... 345/208; 348/59, 56, 57, 47, 53
See application file for complete search history.

(56) References Cited

U.S. PATENT DOCUMENTS

| 2003/0025667 A1* | 2/2003 | Yerazunis | G06F 21/84 345/102 |
| 2010/0201790 A1* | 8/2010 | Son | G02B 27/2264 348/53 |
| 2010/0271396 A1* | 10/2010 | Nemeth | G06F 21/84 345/641 |
| 2011/0285820 A1* | 11/2011 | Bittner | H04N 13/0445 348/46 |
| 2013/0169608 A1* | 7/2013 | Shin | G09G 5/005 345/208 |
| 2013/0314515 A1* | 11/2013 | Shestak | G02B 27/26 348/57 |
| 2014/0063376 A1* | 3/2014 | Tsang | G02B 27/2264 349/13 |
| 2014/0192174 A1* | 7/2014 | Park | H04N 13/0438 348/56 |
| 2014/0210965 A1* | 7/2014 | Goodman | H04N 13/0459 348/56 |
| 2014/0232829 A1* | 8/2014 | Lee | H04N 13/025 348/47 |

* cited by examiner

*Primary Examiner* — Michael E Teitelbaum
*Assistant Examiner* — Sean N. Haiem
(74) *Attorney, Agent, or Firm* — Bart A. Perkins (57) ABSTRACT

A method for receiving an input video frame is provided that generates two obscured frames from the input frame by copying odd lines interspersed with noise lines to one frame and copying even lines interspersed with noise lines to the other frame. The obscured frames are then displayed on a screen with lines polarized in different directions, and a timing signal is output to polarized active shutter glasses such that one lens allows polarized light for lines copied from the original input frame to pass through the lens and be visible to a wearer while the other lens blocks the added noise lines from the wearer's view.

17 Claims, 10 Drawing Sheets

Each Frame Displayed for 1/120<sup>th</sup> of a Second (120fps)

FIG. 9

Each Frame Displayed for 1/240<sup>th</sup> of a Second (240fps)

FIG. 10

Frame 1

| Screen | | Glasses | |
|---|---|---|---|
| Odd Lines (Polarized Clockwise) | Primary Image | Left Eye Lens (Counterclockwise Analyzer) | Opaque: Random Noise Blocked |
| Even Lines (Polarized Counterclockwise) | Random Noise | Right Eye Lens (Clockwise Analyzer) | Transparent: Primary Image Visible |

Frame 2

| Screen | | Glasses | |
|---|---|---|---|
| Odd Lines (Polarized Clockwise) | Random Noise | Left Eye Lens (Counterclockwise Analyzer) | Transparent: Primary Image Visible |
| Even Lines (Polarized Counterclockwise) | Primary Image | Right Eye Lens (Clockwise Analyzer) | Opaque: Random Noise Blocked |

Frame 3

| Screen | | Glasses | |
|---|---|---|---|
| Odd Lines (Polarized Clockwise) | Random Noise | Left Eye Lens (Counterclockwise Analyzer) | Transparent: Primary Image Visible |
| Even Lines (Polarized Counterclockwise) | Primary Image | Right Eye Lens (Clockwise Analyzer) | Opaque: Random Noise Blocked |

Frame 4

| Screen | | Glasses | |
|---|---|---|---|
| Odd Lines (Polarized Clockwise) | Primary Image | Left Eye Lens (Counterclockwise Analyzer) | Opaque: Random Noise Blocked |
| Even Lines (Polarized Counterclockwise) | Random Noise | Right Eye Lens (Clockwise Analyzer) | Transparent: Primary Image Visible |

Frame 1

| Screen | | Glasses A | | Glasses B | |
|---|---|---|---|---|---|
| Odd Lines (Polarized Clockwise) | Image 1 | Left Eye Lens (Counterclockwise Analyzer) | Opaque: Image 2 Blocked | Left Eye Lens (Counterclockwise Analyzer) | Transparent: Image 2 Visible |
| Even Lines (Polarized Counterclockwise) | Image 2 | Right Eye Lens (Clockwise Analyzer) | Transparent: Image 1 Visible | Right Eye Lens (Clockwise Analyzer) | Opaque: Image 1 Blocked |

Frame 2

| Screen | | Glasses A | | Glasses B | |
|---|---|---|---|---|---|
| Odd Lines (Polarized Clockwise) | Image 2 | Left Eye Lens (Counterclockwise Analyzer) | Transparent: Image 1 Visible | Left Eye Lens (Counterclockwise Analyzer) | Opaque: Image 1 Blocked |
| Even Lines (Polarized Counterclockwise) | Image 1 | Right Eye Lens (Clockwise Analyzer) | Opaque: Image 2 Blocked | Right Eye Lens (Clockwise Analyzer) | Transparent: Image 2 Visible |

FIG. 14

Frame 1

| Screen | | Glasses A | | Glasses B | |
|---|---|---|---|---|---|
| Odd Lines (Polarized Clockwise) | Image 1 | Left Eye Lens (Counterclockwise Analyzer) | Opaque: Image 2 Blocked | Left Eye Lens (Clockwise Analyzer) | Opaque: Image 1 Blocked |
| Even Lines (Polarized Counterclockwise) | Image 2 | Right Eye Lens (Clockwise Analyzer) | Transparent: Image 1 Visible | Right Eye Lens (Counterclockwise Analyzer) | Transparent: Image 2 Visible |

Frame 2

| Screen | | Glasses A | | Glasses B | |
|---|---|---|---|---|---|
| Odd Lines (Polarized Clockwise) | Image 2 | Left Eye Lens (Counterclockwise Analyzer) | Transparent: Image 1 Visible | Left Eye Lens (Clockwise Analyzer) | Transparent: Image 2 Visible |
| Even Lines (Polarized Counterclockwise) | Image 1 | Right Eye Lens (Clockwise Analyzer) | Opaque: Image 2 Blocked | Right Eye Lens (Counterclockwise Analyzer) | Opaque: Image 1 Blocked |

FIG. 15

VIDEO DISPLAY FOR VIEWING THROUGH POLARIZED ACTIVE SHUTTER GLASSES

TECHNICAL FIELD

The present disclosure relates to the field of video displays, particularly a system for displaying video such that it is viewable only through synchronized polarized active shutter glasses.

BACKGROUND

Video piracy is a common problem. Unauthorized copies of videos, such as movies and television shows, are often made and distributed without compensation to the owner of the video. This can cost copyright owners and content providers significant amounts of money.

Many copy protection and/or digital rights management schemes have been developed to prevent digitally distributed videos from being copied bit for bit without authorization. For example, digital video is often encoded and encrypted such that only hardware with access to a particular decryption key can decrypt and play back the video.

However, even if copy protection and/or digital rights management make it difficult to copy a digital video directly from a source file, these protection schemes do not protect against someone using a video camera to record otherwise authorized playback of a video from a screen. This is sometimes referred to as the "analog hole," although digital video cameras are also used to capture video playback off screens. For example, while copy protection might prevent a video pirate from ripping video straight from a DVD, the pirate can simply play the DVD on a DVD player and capture the video in real time with a video camera as it is displayed on a television screen. While the result may not be a perfect digital copy, the quality may still be good enough to distribute.

Solutions to the "analog hole" have included inserting high frequency artifact frames into a source video. However, camcorders can be set to a matching sampling frequency in order to filter out the artifact frames and capture only the frames of the main content.

Unauthorized viewing can also be a problem in the context of pay-per-view events. Content providers, such as cable companies, sometimes offer movies, shows, or special events like boxing matches on an on demand basis for a fee. Purchasers gain access to the pay-per-view event, and can display it on their television. However, in some cases the content provider may wish to limit how many people are authorized to gather around the television and watch the event, even when the event has been purchased legally.

SUMMARY

What is needed is a system for displaying video content on a screen while limiting it to being viewed only by those who are wearing synchronized polarized active shutter glasses. The system should partially overlay noise or other images over frames of the main video content. The glasses should be able to filter out the noise or other images so that people wearing the glasses see the main content. In contrast, camcorders trained on the screen or people not wearing the glasses should see the video in obscured form.

In one embodiment, the present disclosure provides for a method of processing and displaying a video frame, the method comprising receiving a video frame displaying a primary image from an input video, generating a first obscured frame by copying odd lines from the primary image and generating and adding noise lines into event lines of the first obscured frame, generating a second obscured frame by copying even lines from the primary image and generating and adding noise lines into odd lines of the second obscured frame, successively displaying the first obscured frame and the second obscured frame on a screen, wherein light output by the screen to display odd lines of the first obscured frame and the second obscured frame is polarized in a first direction, and light output by the screen to display even lines of the first obscured frame and the second obscured frame is polarized in a second direction, and outputting a timing signal with the screen to polarized active shutter glasses comprising a first lens with first analyzing filter configured to allow light that is polarized in the first direction to pass through the first analyzing filter and block light polarized in the second direction, a second lens with a second analyzing filter configured to allow light that is polarized in the second direction to pass through the second analyzing filter and block light polarized in the first direction, and liquid crystal layers in both the first lens and the second lens that are configured to be transparent when no voltage is applied to the liquid crystal layers and become opaque when voltage is applied to the liquid crystal layers, wherein the timing signal informs the polarized active shutter glasses to either make the first lens opaque and the second lens transparent such that the even lines are blocked by the first lens and the odd lines are visible through the second lens, or to make the first lens transparent and the second lens opaque such that the even lines are visible through the first lens and the odd lines are blocked by the second lens.

In another embodiment, the present disclosure provides for a method of processing and displaying video frames, the method comprising receiving a first video frame displaying a first primary image from a first input video, receiving a second video frame displaying a second primary image from a second input video, generating a first obscured frame by copying odd lines from the first primary image and even lines from the second primary image, generating a second obscured frame by copying even lines from the first primary image and odd lines from the second primary image, successively displaying the first obscured frame and the second obscured frame on a screen, wherein light output by the screen to display odd lines of the first obscured frame and the second obscured frame is polarized in a first direction, and light output by the screen to display even lines of the first obscured frame and the second obscured frame is polarized in a second direction, and outputting a timing signal with the screen to polarized active shutter glasses comprising a first lens with a first analyzing filter configured to allow light that is polarized in the first direction to pass through the first analyzing filter and block light polarized in the second direction, a second lens with a second analyzing filter configured to allow light that is polarized in the second direction to pass through the second analyzing filter and block light polarized in the first direction, and liquid crystal layers in both the first lens and the second lens that are configured to be transparent when no voltage is applied to the liquid crystal layers and become opaque when voltage is applied to the liquid crystal layers, wherein the timing signal informs the polarized active shutter glasses to either make the first lens opaque and the second lens transparent such that the even lines are blocked by the first lens and the odd lines are visible through the second lens, or to make the first lens transparent and the second lens opaque such that the even lines are visible through the first lens and the odd lines are blocked by the second lens.

BRIEF DESCRIPTION OF THE DRAWINGS

Further details of the present invention are explained with the help of the attached drawings in which:

FIG. 14 depicts a frame sequence that can be viewed differently through different pairs of polarized active shutter glasses that interpret the same timing signal differently.

FIG. 15 depicts a frame sequence that can be viewed differently through different pairs of polarized active shutter glasses that have lenses polarized oppositely.

DETAILED DESCRIPTION

Figure 1:
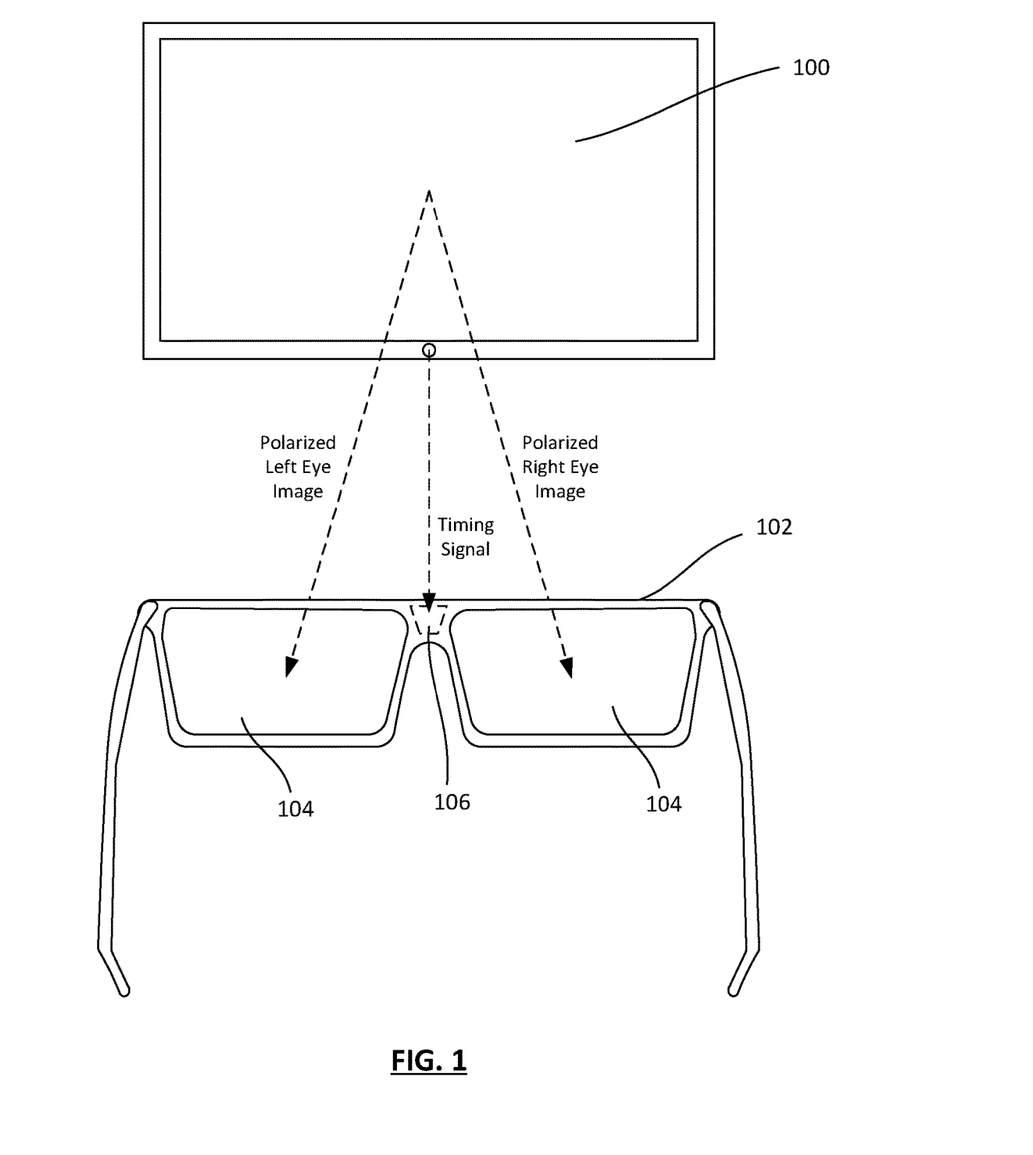
FIG. 1 depicts a system for displaying video content on a screen and selectively allowing the video content to be viewed through polarized active shutter glasses.

FIG. 1 depicts a system for displaying video content on a screen 100 and selectively allowing the video content to be viewed through polarized active shutter glasses 102. The screen 100 can be configured to simultaneously display different images for a viewer's left eye and right eye, with the light output for each image being polarized in different directions. The polarized active shutter glasses 102 can have two lenses 104, a left eye lens and a right eye lens. Each lens 104 can filter out light polarized in the opposite direction as the light output by the screen 100 for a particular eye, such that a viewer can wear the polarized active shutter glasses 102 to see the image for the left eye through the left lens 104 and see the image for the right eye through the right lens 104. The polarized active shutter glasses 102 can also selectively block light from passing through the lenses 104, such that they can allow a viewer to see through either the left eye lens 104 or right eye lens 104 at any one time to control which of the two polarized images the viewer can see on the screen 100.

Figure 2:
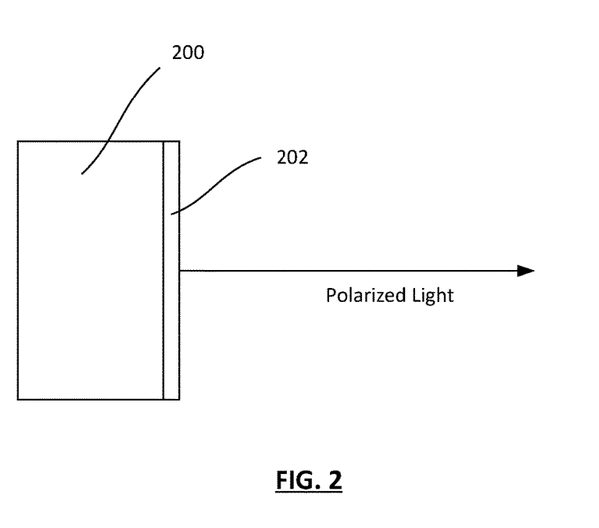
FIG. 2 depicts a side view of a pixel assembly that can output polarized light for an individual pixel on a screen.

FIG. 2 depicts a side view of a pixel assembly 200 that can output polarized light for an individual pixel on a screen 100. A screen 100 can comprise an array of pixels, each with its own pixel assembly 200. By way of a non-limiting example, a screen 100 with a 1080p resolution can have 1080 horizontal lines of pixels. In a screen 100 with a 16:9 aspect ratio, there can be 1920 pixels within each of the 1080 horizontal lines, leading to an overall resolution of 1920 by 1080 pixels. Other screens 100 can have resolutions of 1280 by 720 pixels (720p), 3840 by 2160 pixels (4K), or any other resolution. The screen 100 can have a refresh rate such that it can display video frames at at least double the native framerate of a piece of video content, as will be discussed further below.

Figure 3A:
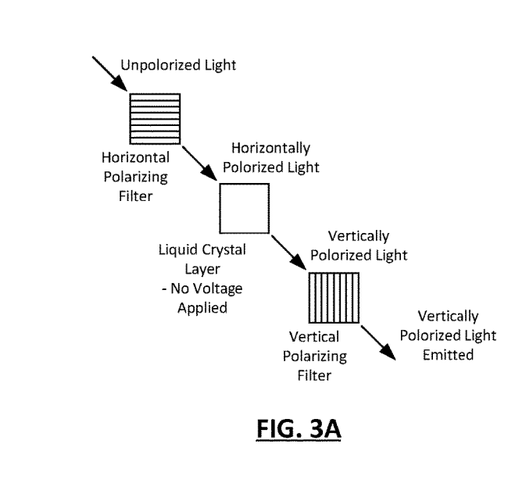
FIG. 3A depicts unpolarized light being polarized by a first linear polarizing filter, being turned 90 degrees by a liquid crystal layer, and passing through a second linear polarizing filter, such that the pixel appears illuminated.
Figure 3B:
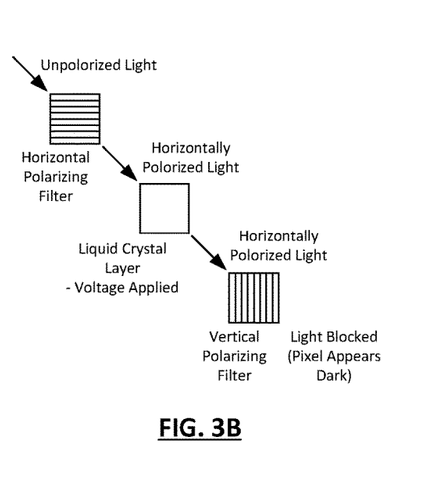
FIG. 3B depicts unpolarized light being polarized by a first linear polarizing filter, passing unchanged through a liquid crystal layer, and being blocked by a second linear polarizing filter, such that the pixel appears dark.

In some embodiments, a screen 100 can be a display that converts unpolarized light from a backlight into linearly polarized light to change the illumination levels of individual pixels. By way of a non-limiting example, the screen 100 can be an LCD display that has one or more backlights, such as such as an array of LEDs (light emitting diodes) or CCFLs (cold cathode fluorescent lamps), that continuously output unpolarized light. The unpolarized light can pass into an array of pixel assemblies 200, each with a first linear polarizing filter, a liquid crystal layer, and a second linear polarizing filter oriented orthogonally to the first linear polarizing filter. By way of a non-limiting example, FIGS. 3A-3B depict an example of an LCD pixel assembly 200 that has a liquid crystal layer sandwiched between a horizontal polarizing filter and a vertical polarizing filter.

In a pixel assembly 200 in an LCD display, the first linear polarizing filter can receive unpolarized light from the backlight and linearly polarize it a first direction by blocking light waves that are not oscillating in that direction. The liquid crystal layer can then either allow the linearly polarized light exiting the first linear polarizing filter to continue oscillating in the first direction, or be turned up to 90 degrees to oscillate in a second direction, depending on whether voltage is applied to the liquid crystal layer. The second linear polarizing filter can block light waves that are not oscillating in the second direction, such that light twisted by the liquid crystal layer to oscillate in the second direction can pass through the second linear polarizing filter and exit as linearly polarized light, as shown in the example of FIG. 3A. Light that passed through the liquid crystal layer and continued oscillating in the first direction can be blocked by the second linear polarizing filter, making the pixel assembly 200 appear dark to a viewer as shown in the example of FIG. 3B.

In some embodiments, sub-pixels within each pixel assembly 200 can be covered by differently colored filters, such as red, green, and blue filters. Applying different voltages to the liquid crystal layer behind each color filter can control the illumination level of each sub-pixel, such that the color displayed by the pixel assembly 200 overall can be changed.

In other embodiments, the screen 100 can be an OLED (organic light-emitting diode) screen, or any other screen in which each pixel has its own illumination that can be independently turned on or off. In these embodiments, each pixel assembly 200 can have a polarizing filter that can polarize light output by the rest of the pixel assembly 200 in a desired direction. In some embodiments, the polarizing filter can polarize light in a linear direction. In other embodiments, the polarizing filter can polarize light in a circular direction.

Returning to FIG. 2, each pixel assembly 200 in a screen 100 can comprise or be covered with a polarizing filter 202 that takes light output by the pixel assembly 200 and polarizes it in a specific direction for viewing with either a viewer's left eye or right eye through the polarized active shutter glasses 102. By way of a non-limiting example, a screen 100 can have a first subset of pixels with polarizing filters 202 that polarize light in a first direction for a left eye lens 104, and a second subset of pixels with polarizing filters 202 that polarize light in a second direction for a right eye lens 104.

In some embodiments the polarizing filters 202 can be circular polarizing filters that can transform linearly polarized light into circular polarized light in either a clockwise or counterclockwise direction. By way of a non-limiting example, in some embodiments polarizing filters 202 can transform linearly polarized light output by the rest of the pixel assembly 200 into clockwise polarized light for left eye images, and into counterclockwise polarized light for right eye images, or vice versa. Circularly polarized light can also be referred to as being polarized in a left hand or right hand direction.

In other embodiments the polarizing filters 202 can be linear polarizing filters that linearly polarize the light output for each eye in substantially orthogonal directions. By way of a non-limiting example, in some embodiments polarizing filters 202 can transform linearly polarized light output by the rest of the pixel assembly 200 into linearly polarized light at an angle of 45 degrees for left eye images, and linearly polarized light at an angle of 135 degrees for right eye images, or vice versa, or at any other angles.

In some embodiments a pixel assembly 200 can be covered with a separate polarizing filter 202. By way of a non-limiting example, some LCD screens can have pixels that all output light that is linearly polarized in the same direction. In this example, separate polarizing filters 202 can be overlaid over some or all of those pixels that can take the outgoing linearly polarized light and polarize it in a different direction.

In other embodiments the polarizing filter 202 can be a polarizing filter already present in the pixel assembly 200. By way of a non-limiting example, in an LCD screen 100 the first polarizing filter, liquid crystal layer, and second polarizing filter can be oriented such that some pixel assemblies 200 output light linearly polarized in a first direction when illuminated, and other pixel assemblies 200 output light linearly polarized in a second direction when illuminated. By way of another non-limiting example, the polarizing filter 202 can be a circular polarizing filter within already present within a pixel assembly 200, such as an OLED pixel assembly.

Two different images can be displayed on the screen 100 at the same time by displaying a left eye image with a first subset of pixels and a right eye image with a second subset of pixels. The pixels displaying the left eye image can polarize their light output in a first direction that will be allowed to pass through the left eye lens 104 of the polarized active shutter glasses 102. Similarly, the pixels displaying the right eye image can polarize their light output in a second direction that will be allowed to pass through the right eye lens 104 of the polarized active shutter glasses 102.

In some embodiments, alternating lines of pixel assemblies 200 in the screen can display different images, with output light polarized in different directions for each image. By way of a non-limiting example, a 1080p screen can have 540 lines with clockwise polarizing filters 202 alternated in an interlaced pattern with 540 lines with counterclockwise polarizing filters 202. As such, a left eye image can be displayed on one set of 540 interlaced lines, while a separate right eye image can be displayed on the other set of 540 interlaced lines.

Figure 4A:
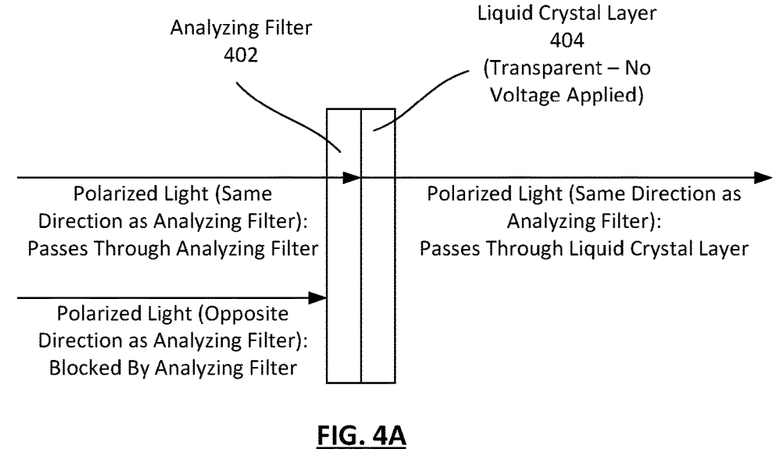
FIG. 4A depicts a cross sectional view of a lens in a pair of polarized active shutter glasses, with a transparent liquid crystal layer.
Figure 4B:
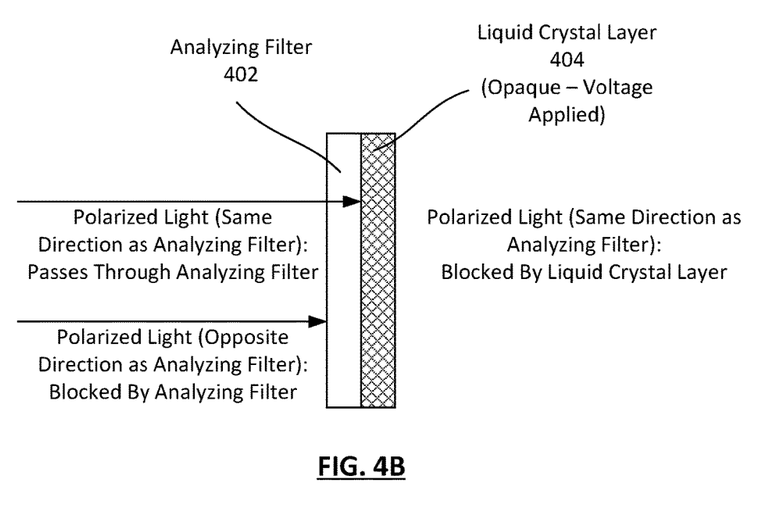
FIG. 4B depicts a cross sectional view of a lens in a pair of polarized active shutter glasses, with an opaque liquid crystal layer.

FIGS. 4A-4B depicts cross sections of a lens 104 in the polarized active shutter glasses 102. Each lens 104 can comprise an analyzing filter 402 and a liquid crystal layer 404. In some embodiments, light from the screen 100 can pass through the analyzing filter 402 and then into the liquid crystal layer 404, while in other embodiments the arrangement can be reversed.

Each analyzing filter 402 can be configured to allow light to pass through the analyzing filter 402 that is oscillating in a specific direction, while blocking and/or filtering out light that is not oscillating in that specific direction. The analyzing filter 402 on the left lens 104 can be configured such that it allows light polarized by pixel assemblies 200 displaying portions of a left eye image to pass through the analyzing filter 402, while blocking light polarized by the pixel assemblies 200 displaying portions of a right eye image. Similarly, the analyzing filter 402 on the right lens 104 can be configured such that it allows light polarized by pixel assemblies 200 displaying portions of a right eye image to pass through the analyzing filter 402, while blocking light polarized by the pixel assemblies 200 displaying portions of a left eye image.

In some embodiments the analyzing filters 402 on each lens 104 can be circular polarizers of opposite handedness mounted in a reverse orientation as the polarizing filters 202 in the screen. In these embodiments, a clockwise analyzing filter 402 can block counterclockwise polarized light, while allowing clockwise polarized light to pass through the clockwise analyzing filter 402. Similarly, a counterclockwise analyzing filter 402 can block clockwise polarized light, while allowing counterclockwise polarized light to pass through the counterclockwise analyzing filter 402.

In other embodiments, the analyzing filters 402 can be linear polarizing filters that block light that is not oscillating in a specific linear direction. By way of a non-limiting example, one lens 104 can have a linear analyzing filter 402 that only allows light oscillating at 45 degrees to pass through it, while the other lens 104 can have a linear analyzing filter 402 that only allows light oscillating at 135 degrees to pass through it.

A lens's liquid crystal layer 404 can be transparent when no voltage is applied to the liquid crystal layer 404, as shown in FIG. 4A. The liquid crystal layer 404 can also become opaque when voltage is applied to the liquid crystal layer 404, as shown in FIG. 4B. As such, light can pass through the lens 104 or be blocked by the lens 104, depending on whether voltage is being applied to the liquid crystal layer 404.

The polarized active shutter glasses 102 can comprise a timing component 106 coupled with the lenses 104. The timing component 106 can selectively block light or allow light to pass through each lens 104 by controlling the voltage applied to each lens's liquid crystal layer 404. In some embodiments, the timing component 106 can receive a timing signal that designates which lens 104 should be transparent or opaque at particular points in time, such that the polarized active shutter glasses 102 can be synchronized with the framerate of images displayed on the screen 100.

Figure 5A:
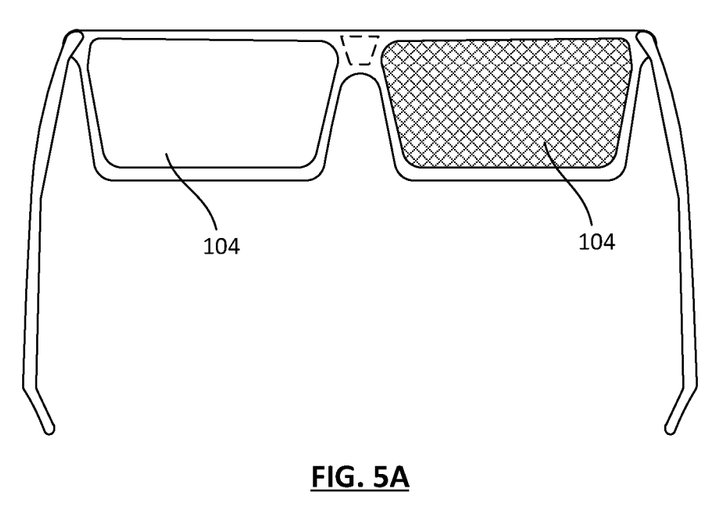
FIGS. 5A-5B depict a pair of polarized active shutter glasses with alternating lenses being transparent and opaque.
Figure 5B:
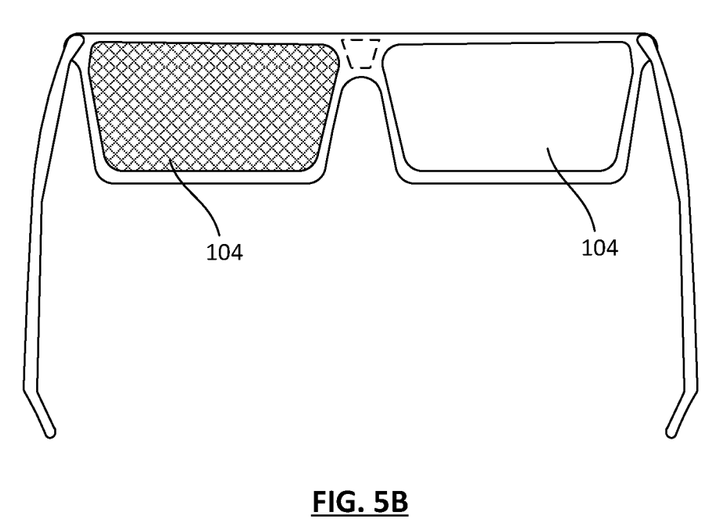

By way of a non-limiting example, the timing signal can designate that the left eye lens 104 should be transparent and the right eye lens 104 should be opaque for $\frac{1}{120}^{th}$ of a second as shown in FIG. 5A, while the left eye lens 104 should be opaque and the right eye lens 104 should be transparent during the next $\frac{1}{120}^{th}$ of a second as shown in FIG. 5B. The lenses 104 can alternate between opaque and transparent according to the timing signal on a consistent preset pattern, or upon any other consistent or inconsistent schedule described by the timing signal.

In some embodiments the timing signal can be output by the screen 100 or other hardware in a monitor or television comprising the screen 100. In other embodiments the timing signal can be output by a media player or video processor that provides a video source to the screen 100, such as a cable box, DVD player, computer, media streamer, gaming console, video encoder, or any other device. In some embodiments the timing component 106 can communicate with the screen 100 or other component wirelessly, such as through a Bluetooth connection, Wi-Fi connection, infrared link, radio frequency, or other data transfer connection. In alternate embodiments the timing component 106 can communicate with the screen 100 or other component through a wired connection. In some embodiments the timing signal can be encrypted or otherwise protected, such that only authorized polarized active shutter glasses 102 can access the timing signal to synchronize their lenses 104 with the screen 100, or such that only predetermined number of polarized active shutter glasses 102 can access the timing signal to synchronize their lenses 104 with the screen 100 at any one time.

Activation of the liquid crystal layer 404 of the lenses 104 and/or operation of the timing component 106 can be powered by an internal power source such as a battery, an external power source, solar power, or any other power source.

As described above, different images can be displayed on different subsets of pixels on the screen 100 simultaneously. In some embodiments or situations a primary image, such as a frame from a video, can be displayed on one set of interlaced lines of pixels for one eye, while random noise can be displayed on the other set of interlaced lines at the same time for the other eye. The screen's polarizing filters 202 can polarize the primary image lines in one direction and the random noise lines in another direction.

The analyzing filters 402 of the polarized active shutter glasses 102 can filter the polarized light received from the screen 100, such that the primary image lines would be visible through one lens 104 and the random noise image lines would be visible through the other lens 104. However, the liquid crystal layers 404 can selectively control the opacity of the lenses 104 such that a viewer sees the primary image lines through one lens 104 and is blocked from seeing the random noise lines with the other lens 104.

The screen 100 and the polarized active shutter glasses 102 can be synchronized using a timing signal such that at any point either the left eye lens 104 is transparent to view primary image lines polarized for the left eye lens 104 and the right eye lens 104 is blocked from viewing random noise lines polarized for the right eye lens 104, or the left eye lens 104 is blocked from viewing random noise lines polarized for the left eye lens 104 and the right eye lens 104 is transparent to view primary image lines polarized for the right eye lens 104. As such, a viewer wearing polarized active shutter glasses 102 synchronized with the screen 100 would see only the primary images at any moment.

In contrast, viewers who are not wearing polarized active shutter glasses 102 would see the primary images and the random noise simultaneously. Similarly, a video camera pointed at the screen 100 would also simultaneously capture both the primary images and the random noise. As such, overlaying the flames of a primary video source with random noise as described above can degrade image quality when the screen 100 is not viewed through polarized active shutter glasses 102 properly synchronized with the screen 100. This kind of degraded image quality can discourage unauthorized viewing and/or piracy of a primary video source displayed on the screen 100.

Figure 6:
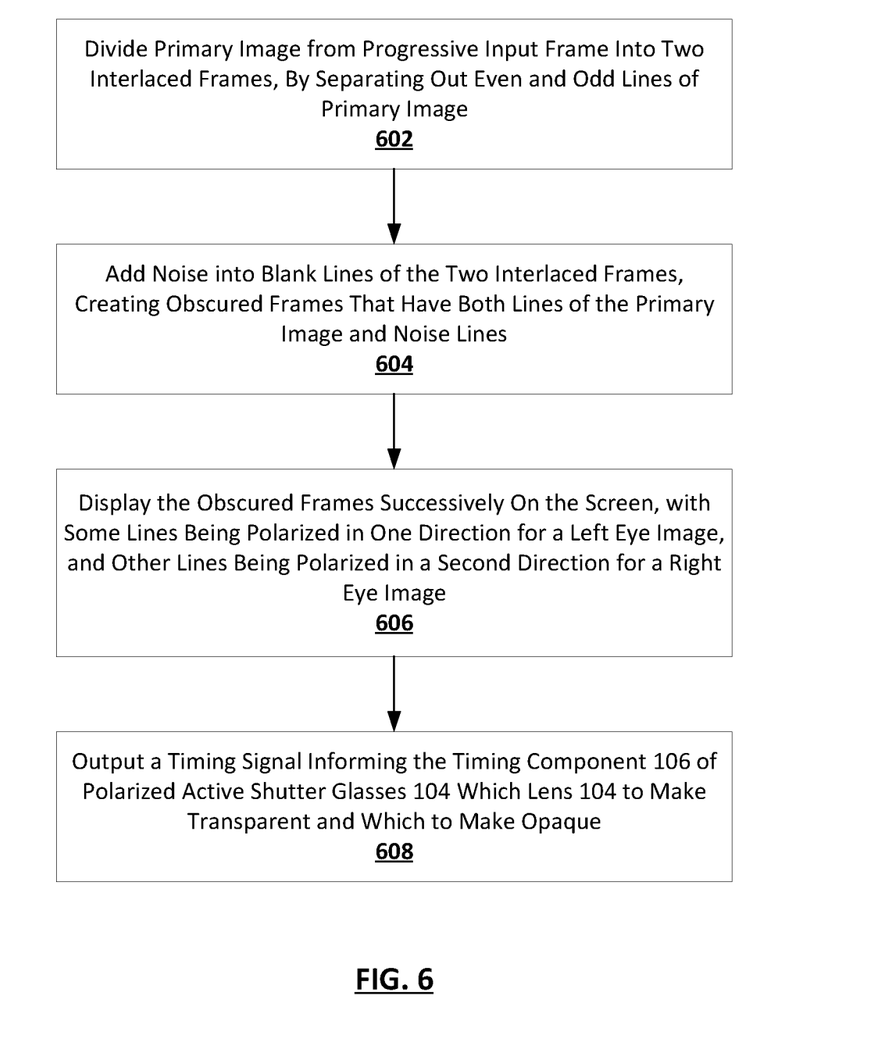
FIG. 6 depicts a method of converting an input video and displaying it on a screen such that the input video is viewable in unobscured form only through polarized active shutter glasses that are synchronized with the screen.

FIG. 6 depicts a method of converting an input video and displaying it on a screen 100 such that the input video is viewable in unobscured form only through polarized active shutter glasses 102 that are synchronized with the screen 100. The primary input video can comprise a series of frames, each frame being a progressive frame with image data on all of its lines.

Figure 7:
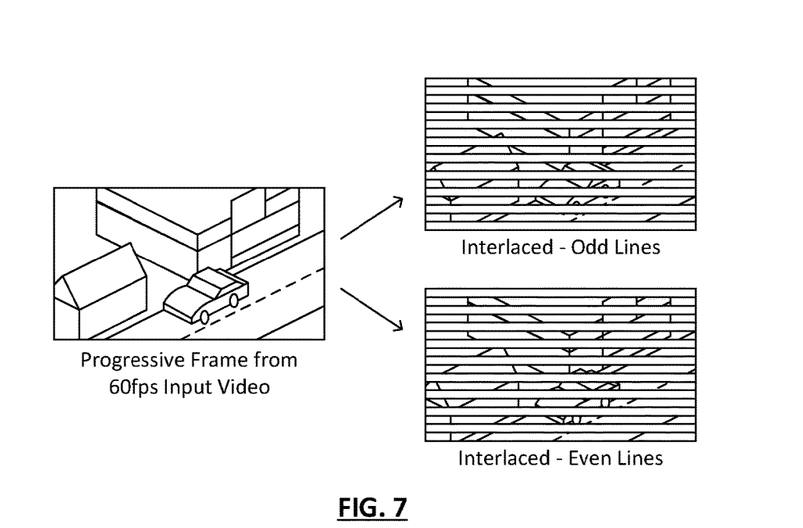
FIG. 7 depicts two interlaced frames being created from a single input frame, where the odd lines from the input frame are used as a first frame and the odd lines from the input frame are used as a second frame.

At step 602, the primary image displayed by each progressive frame of the input video can be divided into two interlaced frames by copying its even and odd lines into separate frames. By way of a non-limiting example, a frame of an input video with 1080p resolution can have full 1080 lines. The primary image from the 1080p frame can copied into two interlaced frames, one with 540 even lines from the primary image and one with 540 odd lines from the primary image. Images of other resolutions can similarly be divided into two interlaced versions by separating out the even and odd lines into different frames. By way of a non-limiting example. FIG. 7 depicts two interlaced frames being created from a single input frame, where the odd lines from the input frame are used as a first frame and the odd lines from the input frame are used as a second frame. During step 602, blank lines can be left in the new frames between the lines taken from the input video frame.

Figure 8:
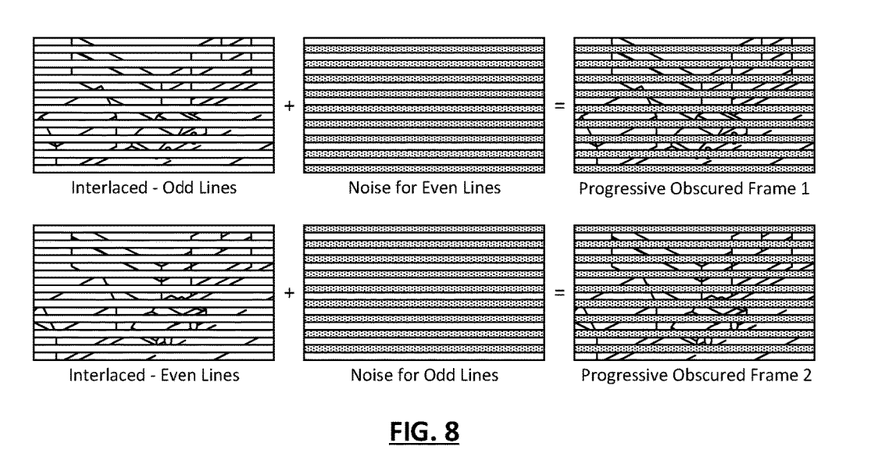
FIG. 8 depicts two obscured frames generated by adding noise lines between lines of the interlaced frames shown in FIG. 7.

During step 604, obscured frames can be created by adding lines of random noise to the two interlaced frames generated during step 602 between the lines taken from the original frame, as shown in FIG. 8. The obscured frames can thus be new progressive frames that each have different lines taken from the original input image alternated with noise lines. By way of a non-limiting example, a first obscured frame can have random noise inserted into its 540 odd lines, with 540 even lines front the primary image. Similarly, a second obscured frame can have random noise inserted into its 540 even lines, with 540 odd lines from the primary image.

In some embodiments the obscured frames can be created by generating interlaced frames with odd noise lines and even noise lines, and then combining them with the interlaced frames generated during step 602 to fill in the blank lines. In other embodiments full progressive frames of noise can be generated, and their even and odd lines can be separated out similarly to step 602 before they are then combined with the interlaced frames generated during step 602. In alternate embodiments, random noise can be generated and displayed at the time the frames generated during step 602 are displayed on the screen 100, to fill in the even or odd blank lines in the frames.

At step 606, the Obscured progressive frames can be displayed on the screen 100. The even and odd lines of each obscured frame can be displayed using lines of pixel assemblies 200. As alternating lines of pixel assemblies 200 can have polarizing filters 202 that polarize outgoing light in opposing directions, the odd lines of each obscured frame can be displayed to viewers with light polarized in one direction while the even lines of each obscured frame can be displayed to viewers with light polarized in a different direction. By way of a non-limiting example, in some embodiments the screen 100 can polarize light from odd lines of each obscured frame in a clockwise circular direction and polarize light from even lines of each obscured frame in a counterclockwise circular direction.

Figure 9:
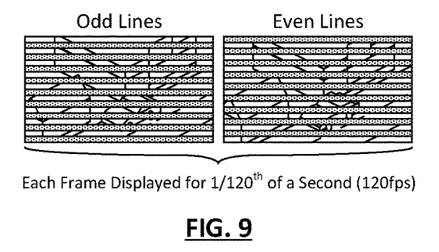
FIG. 9 depicts a sequence of obscured frames being displayed at twice the framerate as an original input video.

The obscured frames can be presented by the screen 100 successively such that an obscured frame with even lines of the primary image and odd lines of noise is followed by an obscured frame with even lines of noise and odd lines of the primary image. Although original progressive frames are divided and processed into two obscured frames during steps 602 and 604, the screen 100 can display the obscured frames an increased framerate compared to the original video. As such, a viewer can perceive the same amount of data from the primary image as the original input frame through the primary image lines of the obscured frames in the same amount of time as each input frame was intended to be viewed. By way of a non-limiting example, when the input video is a 1080p video with a framerate of 60 frames per second (fps), the screen 100 can display the obscured frames at 120 frames per second, such that the odd lines from the primary image are displayed for $1/120^{th}$ of a second followed by the even lines from the primary image for $1/120^{th}$ of a second. As such, both the even and odd lines of the primary image are visible to a viewer during $1/60^{th}$ of a second, just as they were with the original 60 fps framerate. In this example, an original 1080p 60 fps video can be converted to a 1080i 120 fps video during step 602 before noise is added, as shown in FIG. 9.

Figure 10:
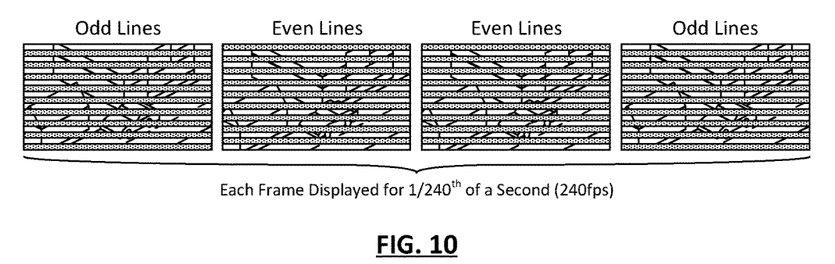
FIG. 10 depicts a sequence of obscured frames being displayed at quadruple the framerate as an original input video.

In some embodiments or situations the framerate can be increased further to combat the perception of flickering by showing the odd lines and even lines of the primary image twice during the timespan of an original input frame. In some embodiments, the screen 100 can display an obscured frame with even lines from the primary image, followed by displaying two obscured frames with odd lines from the primary image, before again displaying an obscured frames with even lines from the primary image. By way of a non-limiting example, a progressive frame from a 60 fps video can be interlaced and shown with the odd lines for $1/240^{th}$ of a second, the even lines for $1/240^{th}$ of a second, the even lines again for $1/240^{th}$ of a second, and the odd lines again for $1/240^{th}$ of a second. In other embodiments, the screen 100 can alternate between displaying an obscured frame with even lines from the primary image and an obscured frame with odd lines from the primary image. In these examples, an original 1080p 60 fps video can be converted to a 1080i 240 fps video during step 602 before noise is added, as shown in FIG. 10.

At step 608, the screen 100 or other hardware can output a timing signal to the polarized active shutter glasses 102. The timing signal can inform the timing component 106 of the polarized active shutter glasses which lens 104 should be opaque and which should be transparent at a particular point in time. The timing signal can thus synchronize the polarized active shutter glasses 102 with the obscured frames being displayed on the screen 100, such that a viewer sees the lines taken from the primary image and is blocked from seeing the noise lines.

Figure 11:
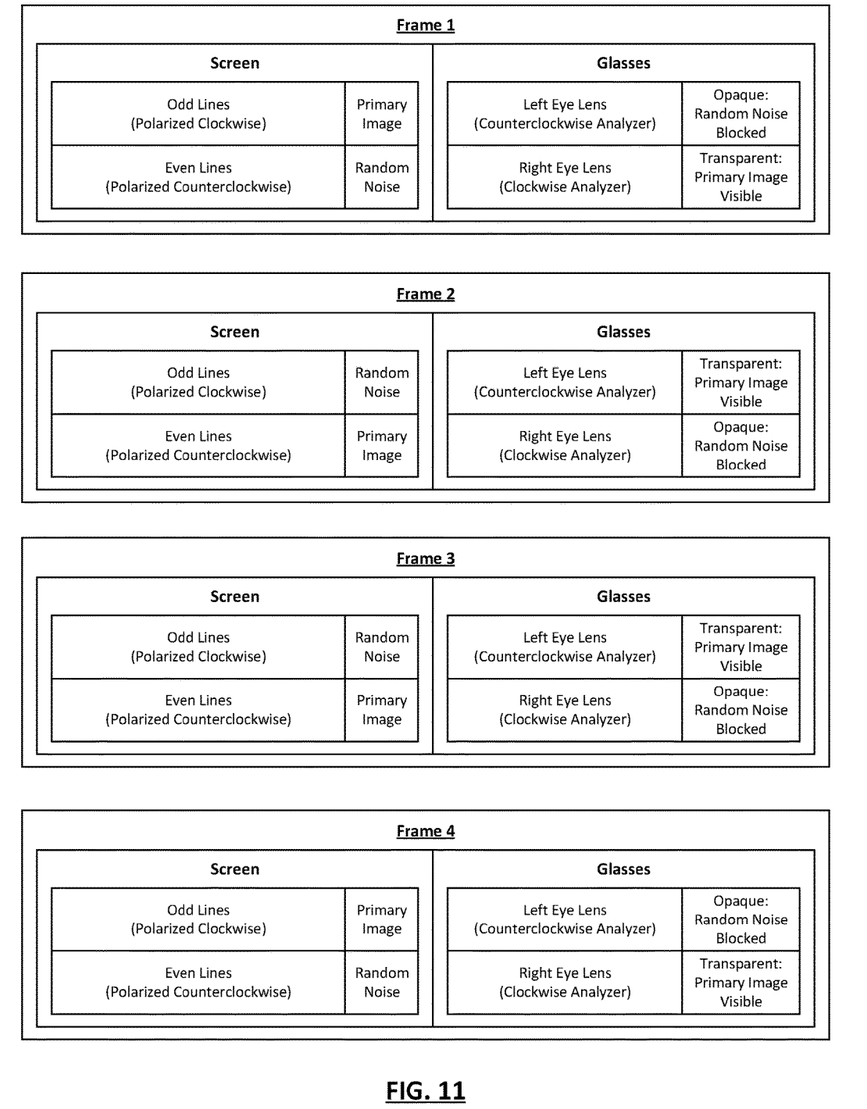
FIG. 11 depicts an arrangement of four obscured frames generated from a single input frame that can be displayed on the screen according to the process of FIG. 6.

By way of a non-limiting example, FIG. 11 depicts an arrangement of four obscured frames generated from a single input frame that can be displayed on the screen 100 according to the process of FIG. 6 at 240 fps. In this example, the screen can first display a first obscured frame with odd lines of the primary image. A second obscured frame with even lines of the primary image can be doubled and displayed as the second and third obscured frame. The screen 100 can then display the first obscured frame, with odd lines of the primary image, again as the fourth obscured frame.

In the example of FIG. 11, the first obscured frame can have odd lines of the primary image that are polarized clockwise by the screen 100 for a viewer's right eye, and even noise lines that are polarized counterclockwise by the screen 100 for a viewer's left eye. In this example, the left eye lens 104 can have a counterclockwise analyzing filter 402 that filters out light that is not polarized counterclockwise, and the right eye lens 104 can have a clockwise analyzing filter 402 that filters out light that is not polarized clockwise. The first obscured frame can be displayed for $1/240^{th}$ of a second. During that $1/240^{th}$ of a second the timing signal can instruct the polarized active shutter glasses 102 to make the left lens 104 opaque and the right lens 104 transparent. As such, the opaque left lens 104 can block the viewer's left eye from seeing the even random noise lines, while the transparent right eye lens can filter out the even noise lines and let the odd primary image lines pass through the lens 104 such that the odd primary image lines are visible to a viewer's right eye during that $1/240^{th}$ of a second.

The screen 100 can then display the second obscured frame during the subsequent $1/240^{th}$ of a second. The second obscured frame can have odd noise lines that are polarized clockwise by the screen 100 for a viewer's right eye, and even lines of the primary image that are polarized counterclockwise by the screen 100 for a viewer's left eye. During this $1/240^{th}$ of a second the timing signal can instruct the polarized active shutter glasses 102 to make the left lens 104 transparent and the right lens 104 opaque. As such, the transparent left lens 104 can filter out the odd noise lines and let the even primary image lines pass through the lens 104 such that the even primary image lines are visible to a viewer's left eye during that $1/240^{th}$ of a second, while the opaque right lens 104 can block the viewer's right eye from seeing the odd random noise lines.

The screen 100 can subsequently display the third and fourth obscured frames each for $1/240^{th}$ of a second in a similar manner, such that the four obscured frames generated from the original primary image are displayed over $1/60^{th}$ of a second. The polarized active shutter glasses 102 can block viewers from seeing the random noise lines during that $1/60^{th}$ of a second, while allowing the viewer to see the lines taken from the primary image displayed by the original frame. As such, a vie per wearing synchronized polarized active shutter glasses 102 can perceive all of the lines from the original frame during the $1/60^{th}$ of a second the original frame was intended the displayed, while being blocked from seeing the noise added to the obscured frames. However viewers not wearing polarized active shutter glasses 102, or those with polarized active shutter glasses 102 that are not synchronized with the screen 100 according to the timing signal, would see video with degraded image quality. For example, viewers without polarized active shutter glasses 102 would random noise overlaid over the primary images.

Viewers with polarized active shutter glasses 102 that aren't properly synchronized may see the wrong lines being blocked such that they inconsistently see clear images and noise.

In some embodiments steps 602 and/or 604 can be performed by processors and/or other hardware within or coupled with a screen 100. By way of a non-limiting example, the steps can be performed substantially in real-time by processors in a television when a video signal is received. In other embodiments, steps 602 and/or 604 can be performed by separate video processing equipment and the resulting obscured frames can be displayed on the screen 100. By way of a non-limiting example, an input video can be pre-processed by an encoder and the generated obscured frames can be saved on a disc or in memory for later viewing. By of another non-limiting example, separate video software and/or hardware can process input video according to steps 602 and/or 604 substantially in real-time, and feed the resulting obscured frames directly to the screen 100. In embodiments in which another piece of hardware performs some of the steps of FIG. 6, the other hardware can generate the timing signal and output it directly to polarized active shutter glasses 102, or provide the timing signal to the screen 100 so that the screen 100 can output the timing signal.

While the examples and embodiments described above depict obscured frames having lines of a primary image for a viewer's left eye being displayed in a consistent sequence with obscured frames having lines of the primary image for a viewer's right eye, in alternate embodiments the obscured frames can be displayed in a random or inconsistent sequence. By way of a non-limiting example, two frames with lines from a primary image for a viewer's left eye can be followed by three frames with lines from the primary image for the viewer's right eye, followed by one frame with lines from the primary image for the viewer's left eye. In some embodiments, the sequence can be controlled or randomized by modulating a duty factor. When the sequence is random or inconsistent, the timing signal can inform the polarized active shutter glasses 102 which lens 104 should be opaque and which should be transparent for every obscured frame displayed on the screen. As such, the polarized active shutter glasses 102 can match the random or inconsistent sequence. A video camera trained on the screen that does not have access to the timing signal may not be able to filter out the noise lines or decode the frame sequence, thereby preventing or discouraging piracy of the input video by recording images as they are displayed on the screen.

Although step 604 described inserting lines of random noise into interlaced frames generated during step 602, in alternate embodiments lines of any other type of noise, pattern, color, shape, image or design can be inserted in place of the random noise to generate obscured progressive frames.

In some alternate embodiments frames of a second input video can be combined with frames from a first input video during step 604, instead of lines of random noise. In these alternate embodiments, step 602 can be performed for progressive frames from two videos, to generate new frames from the even and odd lines of each frame. During step 604, the even lines from a frame of one video can be combined with odd lines of a frame of the other video, and vice versa. The obscured progressive frames containing alternating lines from both videos can be displayed successively on the screen 100 during step 606. A timing signal can be output by the screen 100 or other hardware to inform different pairs of polarized active shutter glasses 102 which lenses 104 should be transparent and which should be transparent at different points in time such that a viewer can either see the first video or the second video. As such, different viewers can wear polarized active shutter glasses 102 that are configured differently to view two different videos on the same screen at the same time.

Figure 12:
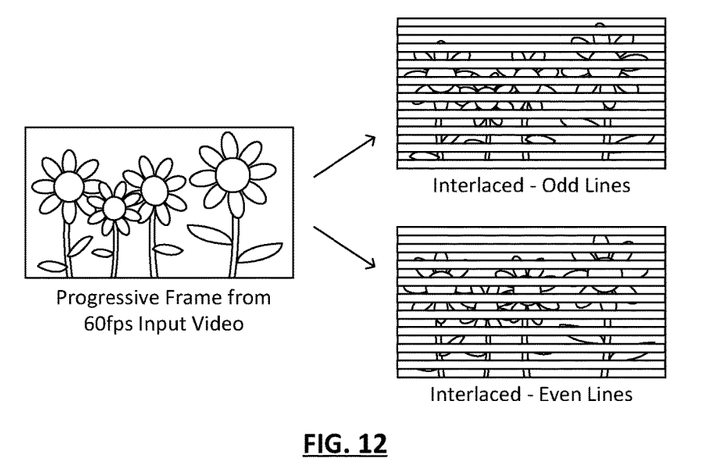
FIG. 12 depicts two interlaced frames being created from an input frame of a second video, where the odd lines from the input frame are used as a first frame and the odd lines from the input frame are used as a second frame.
Figure 13:
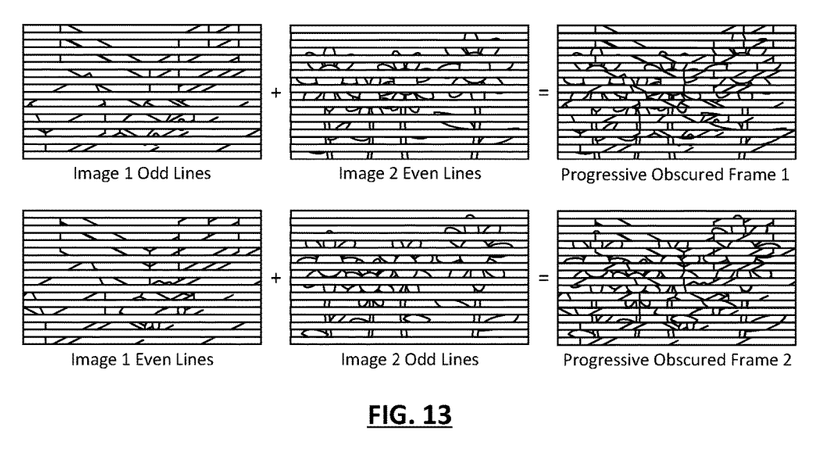
FIG. 13 depicts two obscured frames generated by combining even lines from a first input frame and odd lines from a second input frame, and by combining odd lines from the first input frame and even lines from the second input frame.

By way of a non-limiting example, progressive frames from a first video can be divided into interlaced versions as shown in FIG. 7, while progressive frames from a second video can be divided into interlaced versions as shown in FIG. 12. The interlaced frames shown in FIGS. 7 and 12 can be combined to generate obscured progressive frames having lines from both the first video and the second video, as shown in FIG. 13. Similar to the frames combined with noise lines discussed above with respect to FIGS. 9 and 10, the obscured frames that contain lines of two different videos can be successively displayed on the screen 100 at double the original framerate of the original videos, or at quadruple the original framerate by showing obscured frames twice.

In some embodiments different polarized active shutter glasses 102 can interpret the same timing signal differently, as shown in FIG. 14. By way of a non-limiting example, in response to the same timing signal one pair can make its left lens 104 transparent so that a viewer sees lines of a first video and blocks the second video by making its right lens 104 opaque, while another pair can make its right lens 104 transparent so that a viewer sees lines of a right video and blocks the first video by making its left lens 104 opaque. The lenses 104 made opaque and transparent in each pair of polarized active shutter glasses 102 can switch back and forth based on the timing signal to match the obscured frames being displayed on the screen 100.

In other embodiments the screen 100, or other hardware, can output different timing signals for different polarized active shutter glasses 102. By way of a non-limiting example, a pair of polarized active shutter glasses 102 synchronized with a first timing signal can make lines of a first video viewable and block lines of a second video, while another pair synchronized with a second timing signal can make lines of the second video viewable and block lines of the first video. The lenses 104 made opaque and transparent in each pair of polarized active shutter glasses 102 can switch back and forth based on the two timing signals to match the obscured frames being displayed on the screen 100.

In still other embodiments, different pairs of polarized active shutter glasses 102 can have analyzing filters 402 placed in a reversed arrangement on their lenses 104, such that one pair is configured to view a first video and another pair is configured to view a second video in response to the same timing signal, as shown in FIG. 15. By way of a non-limiting example, a timing signal can instruct polarized active shutter glasses 102 to make their left lenses 104 opaque and their right lenses 104 transparent at a particular time. Although both pairs can thus block light from passing through their left lenses 104, one pair can have a counter-clockwise analyzing filter 402 on its left lens 104 while the other pair can have a clockwise analyzing filter 402 on its left lens 104. As such, one pair's left lens 104 can allow a viewer to see lines of a first video that have been polarized by the screen 100 in a counterclockwise direction, while the other pair's left lens 104 can allow a viewer to see different lines from a second video that have been polarized by the screen 100 in a clockwise direction. The lenses 104 made opaque and transparent in each pair of polarized active shutter glasses 102 can switch back and forth based on the timing signal to match the obscured frames being displayed on the screen 100.

By way of another non-limiting example, viewers wearing different pairs of polarized active shutter glasses 102 can sometimes view the same primary content at selected times, but be presented with customized or different content at other times on a per device basis. As one example, the screen 100 can display a shared television program to two different pairs of polarized active shutter glasses 102, but display different advertisements to each pair during a commercial break. In some embodiments users can pre-associate interest categories with their specific polarized active shutter glasses 102, so that the screen 100 can display targeted content or advertisements relevant to those interests that will be viewable through those particular polarized active shutter glasses 102. As another example, a single screen can display a prime time television program for parents viewable through one set of polarized active shutter glasses 102 while simultaneously displaying more age appropriate content for children viewable through another set of polarized active shutter glasses 102.

In some embodiments a viewer can toggle back and forth between which video they see by pressing buttons or otherwise instructing their pair of polarized active shutter glasses 102 to interpret the timing signal differently as discussed above. In other embodiments the polarized active shutter glasses 102 can be locked into seeing either the first or second video, or can be selectively prevented from toggling back and forth on a time or age-restricted basis. For example, in some embodiments parental settings can allow parents to lock children's polarized active shutter glasses 102 from viewing certain content. In some embodiments where noise lines are alternated with primary images from a single video as discussed above with respect to FIGS. 6 and 8-11, parental controls can allow parents to set a time limit during which children can view the video but only the noise lines after the time limit expires.

In some embodiments or situations when two different video sources are being displayed simultaneously on a screen 100 for different of polarized active shutter glasses 102, the polarized active shutter glasses 102 can have built in earphones, speakers, or headphone ports. The polarized active shutter glasses 102 can receive audio from the screen 100 or other hardware ever a wired or wireless connection, such as a Bluetooth or Wi-Fi connection. By way of a non-limiting example, one pair of polarized active shutter glasses 102 can be configured to view a first video on the screen 100 and can receive and output audio for that first video, while another pair of polarized active shutter glasses 102 can be configured to view a second video on the same screen 100 and can receive and output audio for that second video. In some embodiments the audio signal can be transmitted along with the timing signal, or the polarized active shutter glasses 102 can select which audio source to output based on the timing signal's instructions for synchronizing with a particular video. In other embodiments users can toggle between audio for two videos being displayed on the same screen to find the correct audio track for the video they are viewing.

Although the present invention has been described above with particularity, this was merely to teach one of ordinary skill in the art how to make and use the invention. Many additional modifications will fall within the scope of the invention, as that scope is defined by the following claims.

The invention claimed is:

1. A method of processing and displaying a video frame, comprising:
   receiving a video frame displaying a primary image from an input video;
   generating a first obscured frame by copying odd lines from said primary image and generating and adding noise lines into even lines of said first obscured frame;
   generating a second obscured frame by copying even lines from said primary image and generating and adding noise lines into odd lines of said second obscured frame;
   successively displaying said first obscured frame and said second obscured frame on a screen, wherein light output by said screen to display odd lines of said first obscured frame and said second obscured frame is polarized in a first direction, and light output by said screen to display even lines of said first obscured frame and said second obscured frame is polarized in a second direction with a same polarization as the first obscured frame; and
   outputting a timing signal with said screen to polarized active shutter glasses comprising:
      a first lens with a first analyzing filter configured to allow light that is polarized in said first direction to pass through said first analyzing filter and block light polarized in said second direction,
      a second lens with a second analyzing filter configured to allow light that is polarized in said second direction to pass through said second analyzing filter and block light polarized in said first direction, and
      liquid crystal layers in both said first lens and said second lens that are configured to be transparent when no voltage is applied to the liquid crystal layers and become opaque when voltage is applied to the liquid crystal layers, wherein the liquid crystal layer of the first lens either allows linearly polarized light exiting the first analyzing filter to continue oscillating in the first direction when no voltage is applied to the liquid crystal layer of the first lens or to be turned to oscillate in a different direction when voltage is applied to the liquid crystal layer of the first lens, and wherein the liquid crystal layer of the second lens either allows linearly polarized light exiting the second analyzing filter to continue oscillating in the second direction when no voltage is applied to the liquid crystal layer of the second lens or to be turned to oscillate in a different direction when voltage is applied to the liquid crystal layer of the second lens,
   wherein said timing signal informs said polarized active shutter glasses to either make said first lens opaque and said second lens transparent such that said even lines are blocked by said first lens and said odd lines are visible through said second lens, or to make said first lens transparent and said second lens opaque such that said even lines are visible through said first lens and said odd lines are blocked by said second lens.

2. The method of claim 1, wherein said first obscured frame and said second obscured frame are displayed at twice the framerate as said input video.

3. The method of claim 1, wherein said first obscured frame and said second obscured frame are displayed at quadruple the framerate as said input video by displaying said first obscured frame a first time, said second obscured frame a first time, displaying said second obscured frame a second time, and displaying said first obscured frame a second time.

4. The method of claim 1, wherein said screen comprises an array of pixels each comprising a polarizing filter such that odd lines of pixels have a polarizing filter of a first type that polarizes outgoing light in said first direction, and even lines of pixels have a polarizing filter of a second type that polarizes outgoing light in said second direction.

5. The method of claim 4, wherein said polarizing filters are circular polarizing filters.

6. The method of claim 1, wherein said first direction is a clockwise circular polarized direction and said second direction is a counterclockwise circular polarized direction.

7. The method of claim 1, wherein said timing signal is encrypted.

8. A method of processing and displaying video frames, comprising:
  receiving a first video frame displaying a first primary image from a first input video;
  receiving a second video frame displaying a second primary image from a second input video;
  generating a first obscured frame by copying odd lines from said first primary image and even lines from said second primary image;
  generating a second obscured frame by copying even lines from said first primary image and odd lines from said second primary image;
  successively displaying said first obscured frame and said second obscured frame on a screen, wherein light output by said screen to display odd lines of said first obscured frame and said second obscured frame is polarized in a first direction, and light output by said screen to display even lines of said first obscured frame and said second obscured frame is polarized in a second direction with a same polarization as the first obscured frame; and
  outputting a timing signal with said screen to polarized active shutter glasses comprising:
    a first lens with a first analyzing filter configured to allow light that is polarized in said first direction to pass through said first analyzing filter and block light polarized in said second direction,
    a second lens with a second analyzing filter configured to allow light that is polarized in said second direction to pass through said second analyzing filter and block light polarized in said first direction, and
    liquid crystal layers in both said first lens and said second lens that are configured to be transparent when no voltage is applied to the liquid crystal layers and become opaque when voltage is applied to the liquid crystal layers, wherein the liquid crystal layer of the first lens either allows linearly polarized light exiting the first analyzing filter to continue oscillating in the first direction when no voltage is applied to the liquid crystal layer of the first lens or to be turned to oscillate in a different direction when voltage is applied to the liquid crystal layer of the first lens, and wherein the liquid crystal layer of the second lens either allows linearly polarized light exiting the second analyzing filter to continue oscillating in the second direction when no voltage is applied to the liquid crystal layer of the second lens or to be turned to oscillate in a different direction when voltage is applied to the liquid crystal layer of the second lens,
  wherein said timing signal informs said polarized active shutter glasses to either make said first lens opaque and said second lens transparent such that said even lines are blocked by said first lens and said odd lines are visible through said second lens, or to make said first lens transparent and said second lens opaque such that said even lines are visible through said first lens and said odd lines are blocked by said second lens.

9. The method of claim 8, wherein said first obscured frame and said second obscured frame are displayed at twice the framerate as said first input video and said second input video.

10. The method of claim 8, wherein said first obscured frame and said second obscured frame are displayed at quadruple the framerate as said first input video and said second input video by displaying said first obscured frame a first time, said second obscured frame a first time, displaying said first obscured frame a second time, and displaying said second obscured frame a second time.

11. The method of claim 8, wherein said screen comprises an array of pixels each comprising a polarizing filter such that odd lines of pixels have a polarizing filter of a first type that polarizes outgoing light in said first direction, and even lines of pixels have a polarizing filter of a second type that polarizes outgoing light in said second direction.

12. The method of claim 11, wherein said polarizing filters are circular polarizing filters.

13. The method of claim 8, wherein said first direction is a clockwise circular polarized direction and said second direction is a counterclockwise circular polarized direction.

14. The method of claim 8, wherein said timing signal is encrypted.

15. The method of claim 8, wherein a first pair of polarized active shutter glasses are configured to interpret said timing signal such that lines of said first primary image are visible to a first viewer and lines of said second primary image are blocked for said first viewer, and wherein a second pair of polarized active shutter glasses are configured to interpret said timing signal such that lines of said second primary image are visible to a second viewer and lines of said first primary image are blocked for said second viewer.

16. The method of claim 8, wherein different timing signals are sent to different pairs of polarized active shutter glasses, such that a first pair of polarized active shutter glasses are configured to interpret a first timing signal such that lines of said first primary image are visible to a first viewer and lines of said second primary image are blocked for said first viewer, and wherein a second pair of polarized active shutter glasses are configured to interpret a second timing signal such that lines of said second primary image are visible to a second viewer and lines of said first primary image are blocked for said second viewer.

17. The method of claim 8, further comprising outputting audio signals associated with said first input video and said second input video to said polarized active shutter glasses.

* * * * *